United States Patent
Hauske

(10) Patent No.: US 8,886,693 B2
(45) Date of Patent: Nov. 11, 2014

(54) EFFICIENTLY UPDATE COEFFICIENTS OF AN ADAPTIVE FILTER

(75) Inventor: Fabian Nikolaus Hauske, München (DE)

(73) Assignee: Huawei Technologies Co., Ltd, Shenzhen (CN)

(*) Notice: Subject to any disclaimer, the term of this patent is extended or adjusted under 35 U.S.C. 154(b) by 312 days.

(21) Appl. No.: 13/300,158

(22) Filed: Nov. 18, 2011

(65) Prior Publication Data

US 2012/0096061 A1    Apr. 19, 2012

Related U.S. Application Data

(63) Continuation of application No. PCT/CN2009/072624, filed on Jul. 3, 2009.

(51) Int. Cl.
| | |
|---|---|
| *G06F 17/10* | (2006.01) |
| *H04B 10/69* | (2013.01) |
| *H04B 10/2507* | (2013.01) |
| *H04L 25/03* | (2006.01) |

(52) U.S. Cl.
CPC ...... *H04L 25/03159* (2013.01); *H04B 10/6971* (2013.01); *H04B 10/2507* (2013.01)
USPC ............ 708/300; 708/309; 708/311; 708/319

(58) Field of Classification Search
None
See application file for complete search history.

(56) References Cited

U.S. PATENT DOCUMENTS

| | | | | |
|---|---|---|---|---|
| 4,207,624 A | * | 6/1980 | Dentino et al. | ............... 367/135 |
| 6,256,342 B1 | * | 7/2001 | Schlag et al. | ................ 375/229 |
| 6,842,516 B1 | | 1/2005 | Armbruster | |

FOREIGN PATENT DOCUMENTS

| | | |
|---|---|---|
| CN | 1317194 A | 10/2001 |
| CN | 1790902 A | 6/2006 |
| CN | 101076007 A | 11/2007 |
| WO | WO 03/015273 A1 | 2/2003 |

OTHER PUBLICATIONS

International Search Report and Written Opinion of the International Searching Authority issued in corresponding PCT Patent Application No. PCT/CN2009/072624, mailed Apr. 15, 2010.
Office Action issued in corresponding Chinese Patent Application No. 200980159050.1, mailed May 13, 2013, 9 pages.
Search Report issued in corresponding Chinese Patent Application No. 200980159050.1, mailed May 13, 2013, 2 pages.

\* cited by examiner

*Primary Examiner* — Michael D Yaary
(74) *Attorney, Agent, or Firm* — Brinks Gilson Lione

(57) ABSTRACT

An adaptive filter configured to filter an input signal comprises Fourier transforming unit configured to transform the input signal into a frequency domain signal upon the basis of the Fourier transform, weighting unit configured to weight at least a portion of the frequency domain signal with a filter coefficient of the dispersion filter in frequency domain to obtain a filtered signal in frequency domain, correlating unit configured to correlate the filtered signal in frequency domain to obtain a correlation value, and adaptation unit configured to adapt the filter coefficient upon the basis of the correlation value.

18 Claims, 7 Drawing Sheets

US 8,886,693 B2

EFFICIENTLY UPDATE COEFFICIENTS OF AN ADAPTIVE FILTER

CROSS-REFERENCE TO RELATED APPLICATIONS

This application is a continuation of International Application No. PCT/CN2009/072624, filed on Jul. 3, 2009, which is hereby incorporated by reference in its entirety.

FIELD

The present disclosure relates to digital filtering in communication systems, in particular in optical communication systems.

BACKGROUND

In today's high speed communication systems, optical components are employed in order to transmit information using optical signals. Usually, optical signals are transmitted over optical fibers, which, unfortunately, distort the transmitted signal due to different transmission channel characteristics at different wavelengths. The distortion may comprise wavelength-specific attenuation or chromatic dispersion, the later resulting when signals components at different wavelengths propagate with different velocities along the optical communication channel.

In order to compensate for the distortion, a digital filter may be employed at the receiver to improve the signal's quality for a subsequent detection of the transmitted information. For digitally filtering the received optical signal, first an optical coherent demodulation and, subsequently, an optical-to-electrical conversion upon the basis of e.g. light sensitive diodes are performed. Nevertheless, the resulting digital signal still comprises residual distortion, e.g. chromatic dispersion, which can be reduced by way of digital filtering.

FIG. 7 shows a structure of a conventional chromatic dispersion filter as known from M. Kuschnerov, F. N. Hauske, K. Piyawanno, B. Spinnler, A. Napoli, and B. Lankl, "Adaptive Chromatic Dispersion Equalization for Non-Dispersion Managed Coherent Systems", OFC 2009, paper OMT1. The filter structure comprises a Fast Fourier Transformer (FFT) 701 for transforming a time domain signal into frequency domain. The resulting frequency domain signal multiplied by a multiplier 703 with a filter coefficient, wherein the multiplier 703 has an output connected to an inverse Fast Fourier Transformer (IFFT) 705 for transforming the multiplied signal into time domain. The time domain signal is then provided via a feedback loop to a subtractor 707 subtracting an expectation power from the time domain signal. The resulting signal is provided to a further Fast Fourier Transformer 709 transforming the resulting signal into frequency domain, which signal is subsequently multiplied by a further multiplier 711 with the original frequency domain signal provided by the FFT 701. The output of the multiplier 711 is provided to an adder 713 having a feedback loop for adding a previous addition result to the output signal of the multiplier to obtain a channel coefficient provided to the multiplier 703. As depicted in FIG. 7, time domain signals and frequency domain signals are exploited in order to update the filter coefficients.

With reference to FIG. 7, from a complex value time domain signal s(t), an error criterion $u(t)=|s(t)|^2 - R$ is derived, where R denotes the above mentioned expectation power. This approach relates to the known constant modulus algorithm (CMA). In order to adapt the filter in the frequency domain, the error signal u(t) has to be transferred to the frequency domain by the FFT 701 in order to update the filtering function, i.e. the filter coefficients. After a plurality of consecutive updates, the filter will approximate the ideal filter function $H_{dis}^{-1}(\omega)$ determining the filter coefficients and representing an inverse of the channel filter function introducing chromatic dispersion.

SUMMARY

A goal to be achieved by the present disclosure is to more efficiently update coefficients of an adaptive filter.

According to a first aspect of the disclosure, an adaptive filter is provided, which is configured to filter an input signal for reducing e.g. a chromatic dispersion or a wavelength-specific attenuation. The filter comprises Fourier transforming unit configured to transform the input signal into a frequency domain signal upon the basis of the Fourier transform, weighting unit configured to weight at least a portion of the frequency domain signal with a filter coefficient of the adaptive filter in frequency domain to obtain a filtered signal in frequency domain, correlating unit configured to correlate the filtered signal in frequency domain to obtain a correlation value, and adaptation unit configured to adapt the filter coefficient upon the basis of the correlation value.

The Fourier transforming unit may comprise at least one Fourier transformer to transform the input signal into the frequency domain signal using the Fourier transform, implemented as e.g. a fast or a discrete Fourier transform of e.g. a length of 1024 coefficients. In addition, the weighting unit may be configured to multiply at least a portion of the frequency domain signal with at least one filter coefficient. For example, the weighting unit may comprise one or more multiplier, e.g. a real valued or a complex valued multiplier, to perform the weighting process. The portion of the frequency domain signal may be a single coefficient or sample of the frequency domain signal, which may be real valued or complex valued sample. Thus, the weighting operation may be reduced to a coefficient-wise multiplication. However, the portion of the frequency domain signal may comprise several values forming a vector, each value corresponding to a frequency bin. Furthermore, the weighting unit may be configured to weight the complete frequency domain signal with the filter coefficient or, coefficient-wise, with a corresponding number of filter coefficients of the adaptive filter.

According to an implementation form according to the first aspect, the adaptive filter may be an adaptive chromatic dispersion filter or an adaptive group delay compensation filter or an adaptive filter for compensating wavelength-specific attenuation.

According to an implementation form according to the first aspect, the filtered signal in the frequency domain may represent an optical signal according to a certain optical polarization, e.g. according to a polarization along an x-axis or a y-axis. Thus, the correlation unit may be configured to perform an auto-correlation of the filtered signal provided by the weighting unit in order to obtain the correlation value. The auto-correlation may be performed digitally upon the basis of known digital auto-correlation approaches.

According to an implementation form according to the first aspect, the filtered signal in frequency domain may comprise a first filtered signal portion representing an optical signal according to a first optical polarization, e.g. along an x-axis, and a second filtered signal portion representing an optical signal according to a second optical polarization, e.g. along a y-axis, wherein the correlation unit may be configured to perform a cross-correlation between the first filtered signal portion and the second filtered signal portion to obtain the correlation value. Preferably, the cross-correlation may be performed in frequency domain upon the basis of known digital cross-correlation approaches. In order to separate the optical components corresponding to different polarizations in time domain, e.g. an optical splitter may be arranged before the Fourier transforming unit.

According to an implementation form according to the first aspect, the auto-correlation or the cross-correlation may be weighted to enforce its significant parts and/or to reduce or suppress its less significant parts which may be arranged on an outer end of the correlation vector comprising correlation values.

According to an implementation form according to the first aspect, the adaptation unit may be configured to adapt the filter coefficient upon the basis of an absolute value of the correlation value or upon the basis of a mean value of the correlation value or upon the basis of a mean value of an absolute value of the correlation value. In order to obtain the absolute values, the adaptation unit may be performed to determine the same prior to adapting the filter coefficient. In order to obtain the mean value, the adaptation unit may be configured to determine the mean value upon the basis of a plurality, e.g. two, three or more, of subsequent correlation values or absolute values thereof.

According to an implementation form according to the first aspect, the adaptation unit may be configured to select a further filter coefficient of the adaptive filter in frequency domain from a plurality of predetermined filter coefficients to adapt the filter coefficient for further weighting. Hence, the adaptation unit may iteratively adapt the filter coefficient upon the basis of predetermined filter coefficients. The predetermined filter coefficients may be pre-calculated and stored e.g. in a lookup-table. In order to select the further filter coefficient, the adaptation unit may comprise a selector which may have access to the above mentioned lookup-table.

According to an implementation form according to the first aspect, the Fourier transforming unit may be configured to transform a further input signal into a further frequency domain signal upon the basis of the Fourier transform. In addition, the adaptation unit may be configured to select a further filter coefficient from a plurality of predetermined filter coefficients upon the basis of the correlation value, and to replace the filter coefficient by the further filter coefficient for further weighting. In addition, the weighting unit may be configured to weight at least a portion of the further frequency domain signal with the further filter coefficient to obtain a further filtered signal in frequency domain. The weighting may be performed e.g. by a coefficient-wise filtering.

Furthermore, the correlating unit may be configured to correlate the further filtered signal in frequency domain, in particular to perform an auto-correlation of the further filtered signal in frequency domain, to obtain a further correlation value. The adaptation unit may be configured to determine a mean value of the correlation value or a mean value of an absolute value of the correlation value. Furthermore, the adaptation unit may be configured to determine to determine a further mean value of the further correlation value or a further mean value of an absolute value of the further correlation value. Furthermore, the adaptation unit may further be configured to compare the mean value with the further mean value and to choose the filter coefficient for further weighting if the mean value is smaller than or equal to the further mean value, or to choose the further filter coefficient for further filtering if the further mean value is smaller than or equal to the mean value. In addition, the adaptation unit may select the filter coefficient for further weighting which is associated with e.g. a minimum error value, wherein the minimum error value may be represented by a minimum mean value among the mean values mentioned above. Thus, the adaptation process may iteratively be performed upon the basis of input signals successively following each other. The input signals may correspond to optical signals according to the same or to different polarizations. For example, two subsequent input signals may respectively correspond to distinct input signal portions according to the polarization along the x-axis and the y-axis. However, the input signals may correspond to the same optical polarization.

According to an implementation form according to the first aspect, the input signal may comprise a first input signal portion in time domain representing an optical signal according to a first optical polarization, and a second input signal portion in time domain representing an optical signal according to a second optical polarization. The input signal portions may result from an optical separation of the optical components belonging to different polarizations using e.g. an optical splitter. Thus, the input signal portions may be parallel signal portions according to different polarizations, and can be combined to a vector.

The Fourier transforming unit may be configured to transform the first input signal portion into a first frequency domain signal, and to transform the second input signal portion into a second frequency domain signal, wherein the weighting unit may be configured to weight at least a portion of the first frequency domain signal with the filter coefficient and to weight at least a portion of the second frequency domain signal with a further filter coefficient. For example, the Fourier transforming unit may comprise a first Fourier transformer for transforming the first input signal portion, and a second Fourier transformer for transforming the second input signal portion. Correspondingly, the weighting unit may comprise a first weighting element to weight the first frequency domain signal, and a second weighting element to weight the second frequency domain signal. For example, the filter coefficient and the further filter coefficient may be different filter coefficients for weighting different signals according to different polarizations. However, the filter coefficient and the further filter coefficient may be identical, so that signals according to different polarizations may be weighted, e.g. filtered, using the same filter coefficient.

According to an implementation form of the first aspect of the disclosure, the input signal comprises a first input signal portion in time domain representing an optical signal according to a first optical polarization, and a second input signal portion in time domain representing an optical signal according to a second optical polarization. The Fourier transforming unit may be configured to transform the first input signal portion into a first frequency domain signal, and to transform the second input signal portion into a second frequency domain signal upon the basis of the Fourier transform. For example, the Fourier transforming unit may comprise a first Fourier transformer for transforming the first input signal portion and a second Fourier transformer for transforming the second input signal portion into the time domain. For example, the weighting unit may be configured to weight at least a portion of the first frequency domain signal with the filter coefficient to obtain a first filtered signal in frequency domain, and to weight at least a portion of the second frequency domain signal with a further filter coefficient to obtain a second filter signal in frequency domain. For example, the weighting unit may comprise a first weighting element for the first frequency domain signal, and a second weighting element for the second frequency domain signal, wherein the weighting elements may comprise multipliers for coefficient-wise multiplying the respective signals.

Furthermore, the correlating unit may be configured to cross-correlate the first filtered signal and the second filtered signal in frequency domain to obtain a correlation value.

The adaptation unit may be configured to select another filter coefficient from a plurality of predetermined filter coefficients, and to select another further filter coefficient from a plurality of predetermined filter coefficients for further weighting, the other filter coefficient replacing the filter coefficient, the other further filter coefficient replacing the further filter coefficient. The adaptation unit may further be configured to select the further filter coefficients upon the basis of the correlation value or a mean value of the correlation value or a mean value of an absolute value of the correlation value. Thus, in an adaptation step, the portions of the first and second frequency domain signal may be weighted using the filter coefficient and the further filter coefficient. In a further adaptation step, the filter coefficient may be replaced by another filter coefficient and the further filter coefficient may be replaced by another further filter coefficient, so that further first and second frequency domain signal may be weighted in a further adaptation or iteration step using the same or a different set of filter coefficients.

According to an implementation form according to the first aspect, the correlating unit may be configured to perform an auto-correlation or a cross-correlation of the input signal portions to obtain auto-correlation values and cross-correlation values. Furthermore, the adaptation unit may be configured to adapt the filter coefficient upon the basis of a mean value of the auto-correlation values and of a mean value of the cross-correlation values or upon a basis of absolute values thereof.

According to an implementation form according to the first aspect, the adaptive filter may a linear filter, in particular an all-pass filter having the same absolute value within a predetermined value range or a band-pass filter or a low-pass filter or a high-pass filter, comprising filter coefficients representing a filter transfer function in frequency domain. The above-mentioned predetermined value range may extend from 0 to e.g. 5% of the maximum absolute value of the filter coefficients.

According to an implementation form according to the first aspect, the adaptive filter may be configured to detect and/or to filter time-invariant or slowly varying impairments. For example, low-pass filter effects with a certain bandwidth may be compensated by a corresponding inverse low-pass filter. Furthermore, also a chromatic dispersion (CD) may be compensated using as all-pass filter. However, instead of scanning through different CD values for the all-pass filter, is also is possible to scan through different inverse low pass filters with different bandwidths and to find the optimum filter upon the basis of the inventive approach.

According to an implementation form according to the first aspect, the adaptive filter may further comprise inverse Fourier transforming unit for transforming the filtered signal in frequency domain into a filtered signal in time domain for further processing.

According to a second aspect of the disclosure, a method for adapting filtering coefficients of an adaptive filter is provided. The method comprises transforming an input signal into a frequency domain signal upon the basis of the Fourier transform, weighting at least a portion of the frequency domain signal with a filter coefficient to obtain a filtered signal in frequency domain, correlating at least a portion of the filtered signal in frequency domain to obtain a correlation value, and adapting the filter coefficient upon the basis of the correlation value.

Further steps of the method for adapting filter coefficients are directly derivable from the functionality of the adaptive filter.

According to a third aspect of the disclosure, a communication apparatus is provided, comprising the inventive adaptive filter for adaptively filtering the input signal. The communication apparatus may be a communication receiver configured to receive the input signal prior to filtering, or, alternatively, a communication transmitter configured to transmit the input signal after filtering in order to pre-distort the input signal in advance such that e.g. the chromatic dispersion introducing an inverse distortion is balanced out, or, alternatively, a measurement apparatus configured to measure a chromatic dispersion or other, in particular wavelength-specific, distortions According to a fourth aspect, the disclosure provides a method for processing an input signal, the method comprising adapting filter coefficients according to the method for adapting filter coefficients, and filtering the input signal using the adapted filter coefficients.

Further steps of the method for processing an input signal are directly derivable from the functionality of the adaptive filter.

According to a fifth aspect, the disclosure provides a computer program comprising a program code for executing the method for adapting filtering coefficients or the method for processing an input signal when run in a computer.

BRIEF DESCRIPTION OF THE DRAWINGS

Further embodiments of the disclosure will be described with respect to the following figures, in which.

DETAILED DESCRIPTION OF EMBODIMENTS OF THE DISCLOSURE

Figure 1:
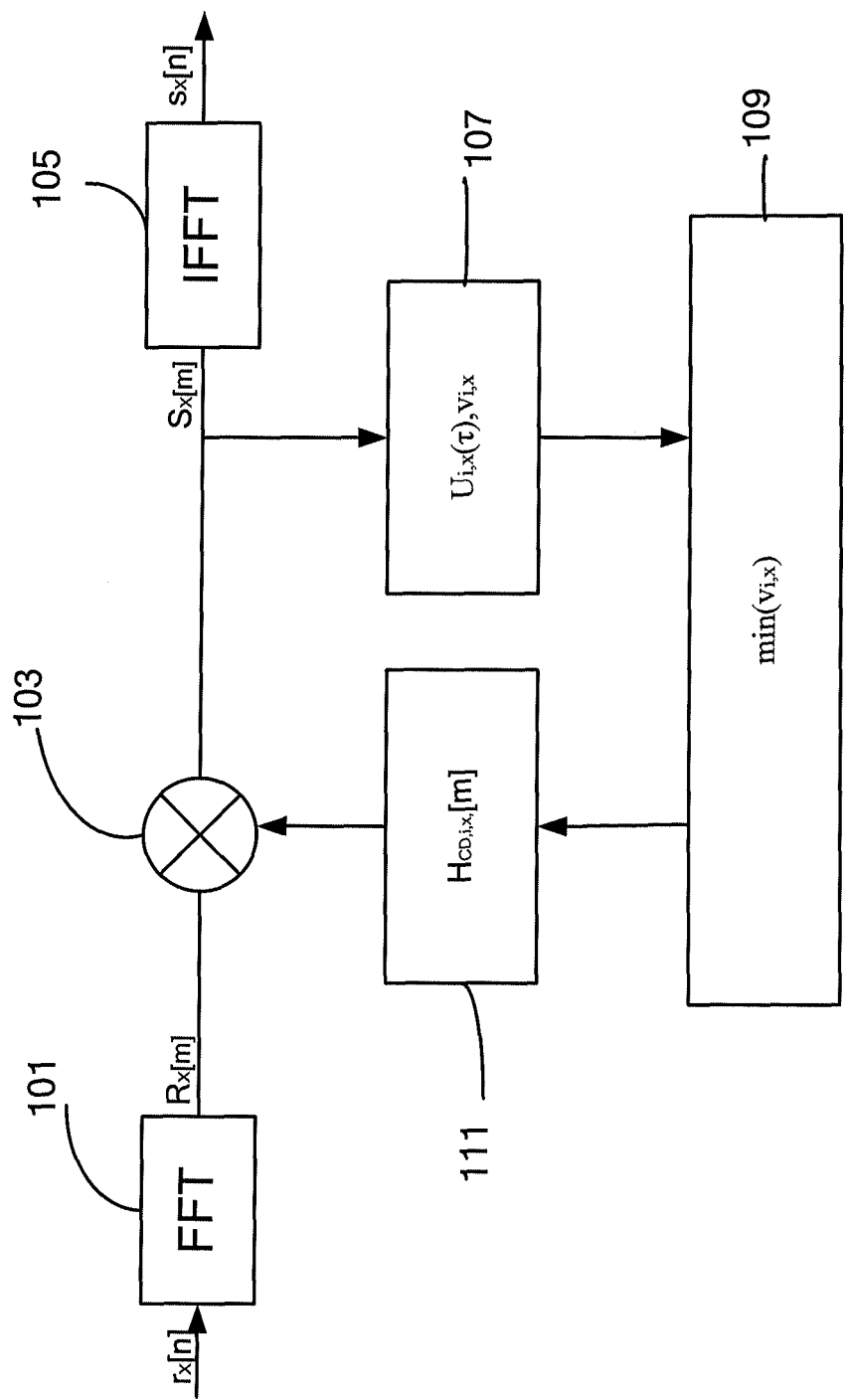
FIG. 1 shows a structure of an adaptive filter.

Before embodiments of the disclosure are described in detail, it is to be understood that this disclosure is not limited to the particular component parts of the devices described or steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" include singular and/or plural referents unless the context clearly dictates otherwise.

The following embodiments are, by way of example, described with reference to chromatic dispersion. It is, however, to be understood that the principles of the present inversion generally apply to any kinds of channel distortions, e.g. group delays or wavelength-specific attenuations.

During propagation along the optical fiber, an optical signal is prone to chromatic dispersion which induces a velocity difference as a function of the frequency which can be characterized by the transfer function $$H_{dis}(\omega) = e^{j \cdot \omega^2 \cdot \beta_2 \cdot L/(8\pi^2)}$$

where L is the length of the fiber, $\beta_2$ is the parameter of group velocity difference and $\omega$ is the radian frequency which relates by $\omega=2\pi f$ to the angular frequency. The inverse function $H_{dis}^{-1}(j\omega)$ determining the filter coefficients of $H_{CD}(j\omega)$ is $$H_{dis}^{-1}(\omega) = H_{CD}(\omega) = e^{-j \cdot \omega^2 \cdot \beta_2 \cdot L/(8\pi^2)}$$

and satisfies $H_{dis}^{-1}(\omega) H_{dis}(\omega) = 1$.

As long as the optical path is not altered, the value of residual chromatic dispersion $$CD = -\beta_2 \frac{2\pi c L}{\lambda^2}$$

is constant over time, wherein $\lambda$ denotes a carrier wavelength of a signal.

According to some implementations of the disclosure, an estimation criterion may be extracted in the frequency domain before the IFFT. Thus, the following estimation vector may be calculated $$U_i(\tau) = |S_i(f) \otimes S_i^*(-f)| = |ACF\{S_i f\}|$$

where $\otimes$ denotes a convolution, e.g. a linear convolution, and S* denotes the complex conjugate of S. The estimation vector refers to the auto-correlation function (ACF). The mean value $$v_i = \langle U_i(\tau) \rangle$$

defines the estimation variable for the filtering with a possible inverse of $H_{dis,i}(f)$, wherein $H_{dis,i}(f)$ denotes the transfer function of the channel impairment, e.g. dispersion. Repeating to calculate $v_i$ for all possible or for all predetermined filtering functions within a given range of dispersion values with a defined step width, a vector of the estimation variable v may be received where each vector element $v_i$ refers to one dispersion compensation function $H_{CD,i}(f)$. The index of the minimum min(v) indicates the optimum filtering function.

In order to describe the channel characteristics in frequency domain, the transmitted signals in frequency domain according to different polarizations are denoted by X(f) and Y(f), wherein the received signal is denoted by R(f). The channel characteristic is determined by polarization effects, which may be described by a matrix, the chromatic dispersion filter function $H_{CD}(f)$, and other linear effects resulting from amplitude filtering (AF) $H_{AF}(f)$. The latter are identical in both polarizations. Thus $$R(f) = \begin{bmatrix} R_x(f) \\ R_y(f) \end{bmatrix}$$
$$= H(f) \begin{bmatrix} X(f) \\ Y(f) \end{bmatrix}$$
$$= H_{CD}(f) H_{AF}(f) \begin{pmatrix} H_{11}(f) & H_{12}(f) \\ H_{21}(f) & H_{22}(f) \end{pmatrix} \begin{pmatrix} X(f) \\ Y(f) \end{pmatrix}$$

and $$R_x(f) = H_{CD}(f) H_{AF}(f) [X(f) H_{11} + Y(f) H_{12}]$$
$$R_y(f) = H_{CD}(f) H_{AF}(f) [X(f) H_{21} + Y(f) H_{22}]$$

Hence, the received signals in frequency domain according to different polarizations my separately be described and processed.

FIG. 1 shows a structure of an adaptive filter comprising Fourier transforming unit 101 having an input and an output, wherein the output is connected to weighting unit 103. The weighting unit 103 has an input and an output, wherein the output is connected to inverse Fourier transforming unit 105. The output of the weighting unit 103 is further coupled to correlating unit 107. An output of the correlating unit 107 is coupled to adaptation unit comprising minimum mean value determining unit 109 and coefficient selecting unit 111. An output of the adaptation unit, more precisely an output of the coefficient selecting unit 111, is coupled to the further input of the weighting unit 103. The Fourier transforming unit 101, the weighting unit 103, the inverse Fourier transforming unit 105, the correlating unit 107, the minimum mean value determining unit 109 and the coefficient selecting unit 111 may be implemented on a circuit including a processor. The processor maybe a digital signal processor or any other microprocessors specifically designed to handle Digital Signal Processing tasks.

The Fourier transform unit 101 may be implemented upon the basis of a Fast Fourier Transform or a Discrete Fourier Transform (DFT). Correspondingly, the inverse Fourier transforming unit 105 may be implemented upon the basis of an inverse FFT or an inverse DFT. Furthermore, the weighting unit 103 may be implemented for weighting the frequency domain signal or at least a portion thereof provided by the Fourier transforming unit 101.

The Fourier transforming unit 101 receives a time domain signal $r_x[n]$ which is transformed into a frequency domain signal $R_x[m]$, which subsequently is provided to the weighting unit 103. The weighting unit 103 outputs a filtered signal in frequency domain, $S_x[m]$, which is transformed into time domain by the inverse Fourier transforming unit 105 which provides a time domain signal $s_x[n]$. The filtered signal in frequency domain, $S_x[m]$, is also provided to the correlation unit 107 which may calculate an auto-correlation vector $U_{i,x}(\tau)$ by auto-correlating subsequent samples of the filtered signal $S_x[m]$ in frequency domain. According to an example, the correlating unit 107 may also calculate a mean value $v_{i,x}$ of the correlation values $U_{i,x}(\tau)$ or of absolute values thereof. The minimum mean value determining unit 109 may be configured to select a minimum mean value of the correlation values for subsequent selection of the filter coefficient $H_{CD,i,x}[m]$ associated therewith As shown in FIG. 1, the coefficients of the adaptive filter are adapted upon the basis of signals according to one polarization, e.g. according to the x-polarization, wherein the vector $U_{i,x}(\tau)$ may be obtained from the auto-correlation of $R_x[m]$. However, the same adaptation approach may also be employed for adaptation upon the basis of a signal according to the y-polarization. In both cases, the time domain input signal, $r_x[n]$ or $r_y[n]$, may be a complex valued signal having a real part and an imaginary part. Furthermore, a common estimation based on the combined information from x- and x-polarization may be also applied, wherein e.g. a mean value of both estimations may be determined.

Figure 2:
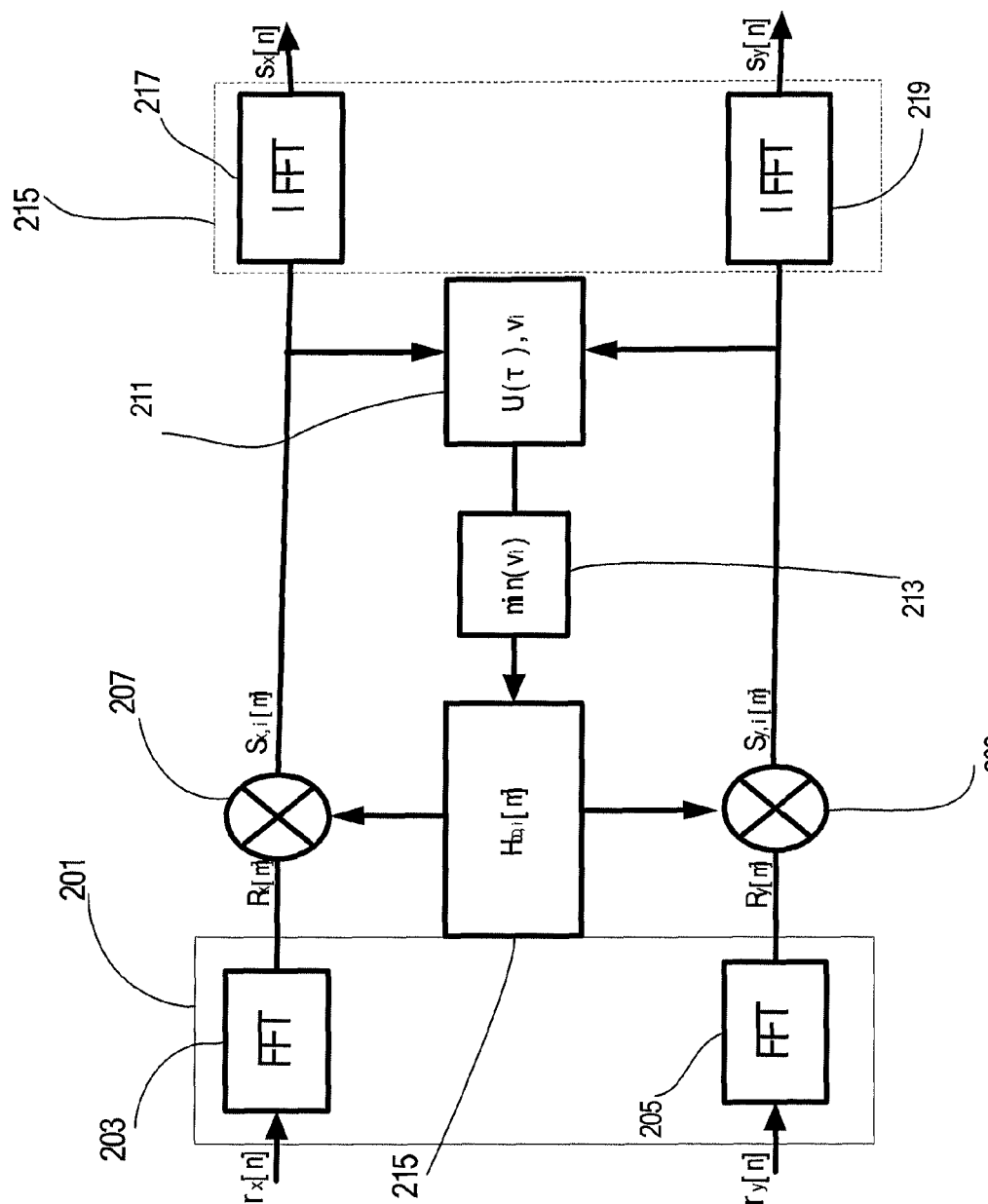
FIG. 2 shows a structure of an adaptive filter.

FIG. 2 shows a structure of an adaptive chromatic filter comprising Fourier transforming unit 201 with a first Fourier transformer 203 and a second Fourier transformer 205. The filter further comprises weighting unit comprising a first multiplier 207 and a second multiplier 209. An output of the first Fourier transformer 203 is coupled to an input of the first multiplier 207, the first multiplier 207 having a further input and an output. Correspondingly, an output of the second Fourier transformer 205 is coupled to the second multiplier 209, the second multiplier 209 having a further input and an output. The outputs of the first multiplier 207 and the second multiplier 209 are coupled to correlating unit 211. The correlating unit 211 has an output coupled to an adaptation unit, in particular to a minimum mean value determining unit 213 of the adaptation unit. The selector 213 has an output coupled to coefficient selecting unit 215 having a first output coupled to the second input of the first multiplier 207, and a second output coupled to the second input of the second multiplier 207. The filter further comprises inverse Fourier transforming unit 215 having e.g. a first inverse Fourier transformer 217 for transforming the first filtered signal into a time domain signal, $s_x[n]$, and a second Fourier transformer 219 transforming the second filtered signal into a time domain signal, $s_y[n]$. Thus, the adaptation and filtering process may completely performed in the frequency domain.

The input signal provided to the Fourier transforming 201 may be described as $$r_x[n]=Re\{r_x[n]\}+j \cdot Im\{r_x[n]\}$$

$$r_y[n]=Re\{r_y[n]\}+j \cdot Im\{r_y[n]\}'$$

where $r_x[n]$ and $r_y[n]$ denote input signal portions corresponding to different polarizations x and y, respectively. The first input signal portion $r_x[n]$ is provided to the first Fourier transformer 203 which may be implemented as a fast Fourier transformer. The first Fourier transformer 203 transforms the first input signal portion into frequency domain to obtain a frequency domain signal $R_x[m]$ provided to the first multiplier 207. The first multiplier 207 multiplies the first frequency domain signal with a filter coefficient provided by the coefficient selecting unit 215 to obtain the filtered signal $S_{x,i}[m]$, wherein the index "i" denotes the i-th filtered signal. Correspondingly, the second Fourier transformer 205 which may be implemented as a fast Fourier transformer receives the second input portion $r_y[n]$ and transforms the first input signal portion $r_y[n]$ into frequency domain to obtain the second frequency domain signal $R_y[m]$, which is provided to the second multiplier 209 multiplying the second frequency domain signal by a further filter coefficient provided by the coefficient selecting unit 215 to obtain a second filtered signal, $S_{y,i}[m]$. The first and the second filtered signals are provided to the correlation unit 211 configured to cross-correlate the first and the second input signal to obtain the correlation value $U_i(\tau)$. The correlation unit 211 or the adaptation unit further determines upon the basis of the correlation value or the correlation values a mean value $v_i$ representing a mean value of the correlation value or a mean value of an absolute value of the correlation value. The unit 213 determines the minimum determined mean value among the plurality of determined mean values so that the coefficient selecting unit 215 selects the filter coefficients associated with the minimum mean value for further weighting in a next adaptation step. As depicted in FIG. 2, the respective serial digital signal r[n] may be cut into blocks of length M, so that each block is transferred by the respective Fourier transformer 203, 205 to obtain the spectral vectors R[m], S[m] and $H_{CD,i}[m]$ having the length M.

The correlation unit 107 and 211 may be configured to determine the respective correlation value $U_i[\tau]$ as follows $$U_i(\tau) = |S_{i,x}[m] \otimes S_{i,y}^*[-m]|$$

$$= |CCF\{S_{i,x}[m], S_{i,y}[m]\}|$$

$$= \left| \sum_{m=1}^{M} circshift\{S_{i,x}[m], \tau\} \cdot S_{i,y}^*[m] \right|$$

with circular shift "circshift" and the scalar multiplication of vectors denoted by "·", where $\otimes$ denotes, by way of example, a circular convolution, and S* denotes the complex conjugate of S. The negative argument [−m] denotes a vector reversed in order, which relates to (−f) in the time-continuous notation. Furthermore, the above correlation can be described by the sum over the scalar product of circularly shifted vectors. Correspondingly, the auto-correlation is defined as $$U_{i,x}(\tau) = |S_{i,x}[m] \otimes S_{i,x}^*[-m]| = |ACF\{S_{i,x}[m]\}|$$

$$'U_{i,y}(\tau) = |S_{i,y}[m] \otimes S_{i,y}^*[-m]| = |ACF\{S_{i,y}[m]\}|$$

wherein CCF denotes a cross-correlation function and ACF denotes an auto-correlation function.

The vectors $S_{x,i}[m]$ and $S_{y,i}[m]$, m=1, 2, ..., M, describe the discrete representation of the received signal in the frequency domain according to the polarizations x and y. They are the result of the spectra $R_x[m]$ and $R_y[m]$ of the received signals filtered with a dispersion compensating function $H_{CD,i}[m]$ by $$S_{x,i}[m] = R_x[m] \cdot H_{CD,i}[m] \text{ and}$$

$$S_{y,i}[m] = R_y[m] \cdot H_{CD,i}[m].$$

The index i accounts for a certain choice of chromatic dispersion.

The error criterion $v_i$ may be defined by the average value of $U_i[\tau]$ as $$v_i = \langle U_i(\tau) \rangle = \frac{1}{N} \sum_{\tau=1}^{N} U_i[\tau].$$

By way of example, when scanning the dispersion filtering function $H_{CD,i}[m]$ through a range of possible filter functions, e.g. i=1:CD=−30000 ps/nm in steps of 200 ps/nm up to e.g. i=151:CD=+300000 ps/nm, the index i of the minimum value $$\min_i(v_i)$$

may indicate the optimum filtering function $H_{CD,i}[m]$.

Further embodiments may apply a modified auto-correlation function $U_{i,x}[\tau] = |S_{i,x}[m] \otimes S_{x,i}^*[-m]|$ (for $U_{i,y}[\tau]$ vice versa), averaging over several FFT-blocks and weighting functions $w[\tau]$ to improve the decision variable as follows $$v_i = \langle U_i(\tau) \rangle = \frac{1}{N} \sum_{\tau=1}^{N} w[\tau] U_i[\tau].$$

According to come implementations, an estimation criterion in frequency domain is extracted prior to performing the IFFT. Thus, the estimation vector $$U_i(\tau) = |S_i(f) \otimes S_i^*(-f)| = |ACF\{S_i(f)\}|$$

may be calculated, where $\otimes$ denotes a circular convolution, and S* denotes the complex conjugate of S. The estimation vector refers to the auto-correlation function (ACF). The mean value $$v_i = \langle U_i(\tau) \rangle$$

defines the estimation variable for the filtering with the filter coefficients. Repeating to calculate $v_i$ for all possible filtering functions within a given range of dispersion values with a defined step width, a vector of the estimation variable v is provided, where each vector $v_i$ element refers to one dispersion compensating function $H_{CD,i}(f)$. For example, the index of the minimum min(v) indicates the optimum filtering function.

Figure 3:
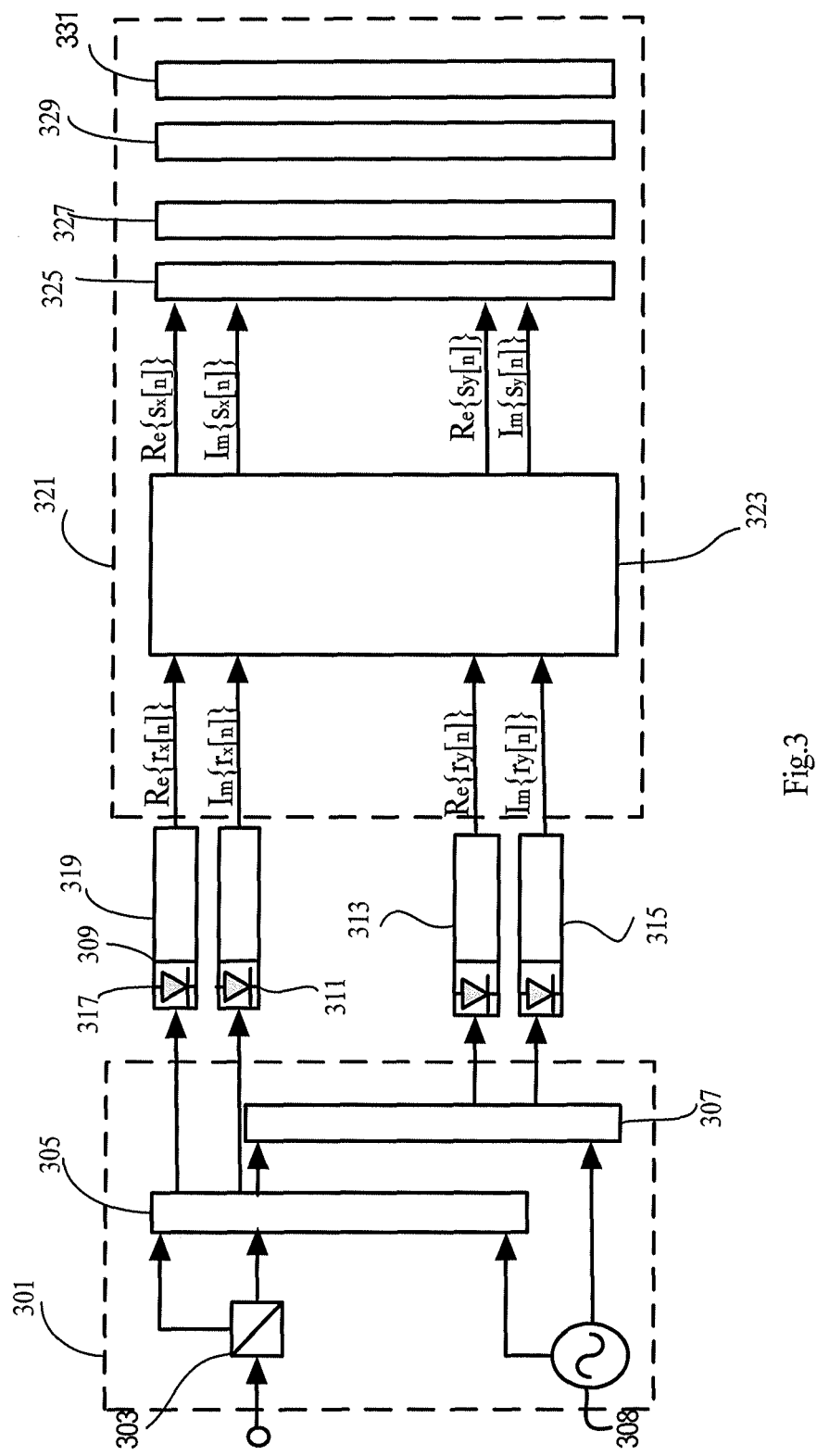
FIG. 3 shows a structure of a receiver.

FIG. 3 shows a receiving apparatus implementing the principles of the present disclosure. The receiving apparatus comprises an optical front-end 301 comprising a polarization beam splitter 303 having a first output coupled to a first hybrid 305 and a second output coupled to a second hybrid 307. The optical front-end 301 further comprises a local oscillator 308 having two outputs respectively coupled to the respective hybrid 305 and 307. The hybrids 305 and 307 may comprise circuitry to determine two signals shifted by 90° upon the basis of the respective input signal. Thus, each hybrid 305, 307 comprises two outputs for providing a so-called complex valued signal having components shifted by 90°. In particular, the first hybrid 305 comprises a first input coupled to a first converting unit 309, and a second output coupled to a second converting unit 311. Correspondingly, a first output of the second hybrid is coupled to a first converting unit 313 and to a second converting unit 315. Each converting unit 309 to 315 may comprise an optical diode 317 for transforming the respective optical signal provided by the respective hybrid 305, 307 into a corresponding electric signal. In addition, each path can be also detected by a pair of photo diodes with the received signal being the difference of each diode in a balanced detection manner. Furthermore, each transforming unit 309 to 315 may comprise an analog-to-digital converter 319 for converting the analog electric signal provided by the respective diode 317 into digital domain. The outputs of the transforming unit 311 to 315 may be coupled to a digital equalization and data recovery unit 321 comprising an adaptive filter 323 according to the principles of the present disclosure.

The adaptive filter 323 receives an input signal comprising e.g. four input signal portions. The first input signal portion, $Re\{r_x[n]\}$, $Im\{r_x[n]\}$ represents the x-polarization, and the second input signal portion, $Re\{r_y[n]\}$, $Im\{r_y[n]\}$ represents the y-polarization.

The adaptive filter 323 is adapted in frequency domain upon the basis of the received input signals. After filtering and transforming the filtered signals into time domain, the respective filtered signals in time domain, $Re\{s_x[n]\}$, $Im\{s_x[n]\}$, $Re\{s_y[n]\}$, $Im\{s_y[n]\}$, are provided to optional signal processing blocks, e.g. comprising a timing recovery 325, a butterfly filter 327, a carrier recovery 329 and a symbol estimation 331 according to any of the known approaches for timing recovery, butterfly filter, carrier recovery and symbol estimation.

By way of example, the filter adaptation or acquisition procedure may apply the following steps:
1) choose a filter $H_{CD,i}[m]$,
2) calculate the filtered signals $S_{x,i}[m]$ and $S_{y,i}[m]$,
3) obtain the corresponding correlation value $U_i(\tau)$ and the mean value $v_i$,
4) repeat steps 1), 2) and 3) for the predetermined, in particular for all predetermined, functions $H_{CD,i}[m]$, and
5) search for the index i denoting the minimum mean value v to obtain the best matching filter coefficients (or function) $H_{CD,i}[m]$.

In particular two major phases for operating the system shown in FIG. 3, may be identified according to some embodiments. The first phase comprises filter acquisition, i.e. adaptation, and initial convergence of the adaptive filter. The phase 2) comprises a continuous tracking of time variant channel distortion. Preferably, the adaptation of the filter with the search for the best matching dispersion filter function or coefficient is performed during the first phase. After the best filter coefficient or filter coefficients has or have been obtained, the system may be switched to phase 2), in which no further adaptation action is necessary since the parameters describing the chromatic dispersion effects do not change over time. In order to start a new acquisition procedure, the system may be reseted or triggered for new adaptation.

Figure 4:
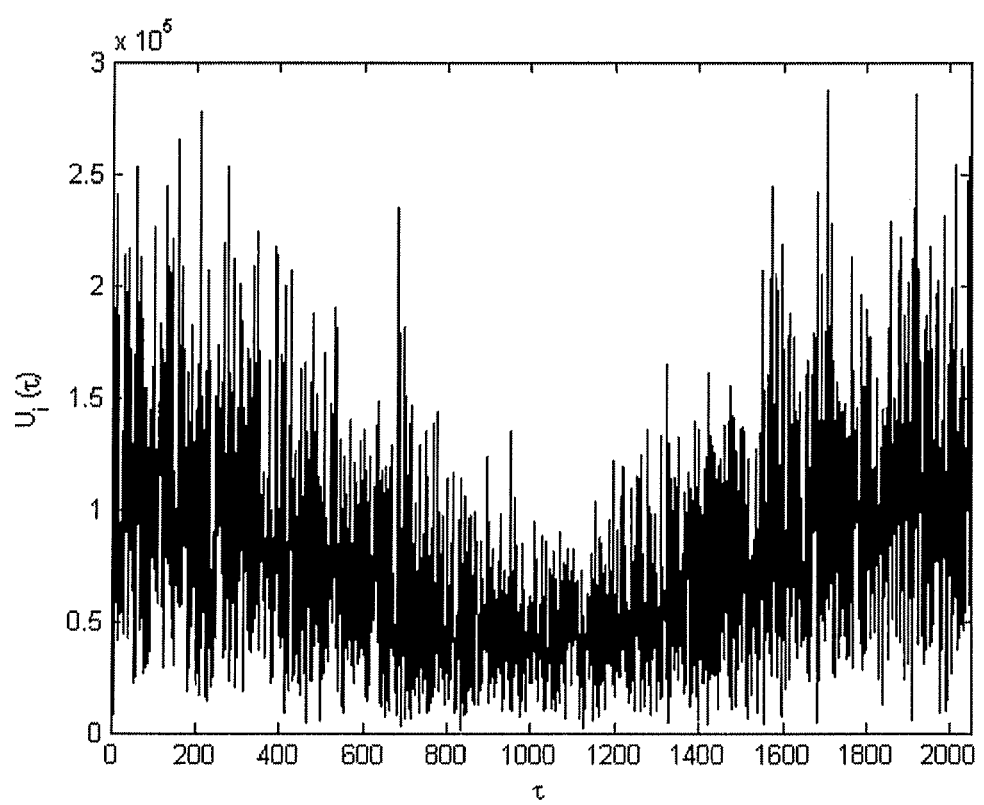
FIG. 4 shows correlation values.
Figure 5:
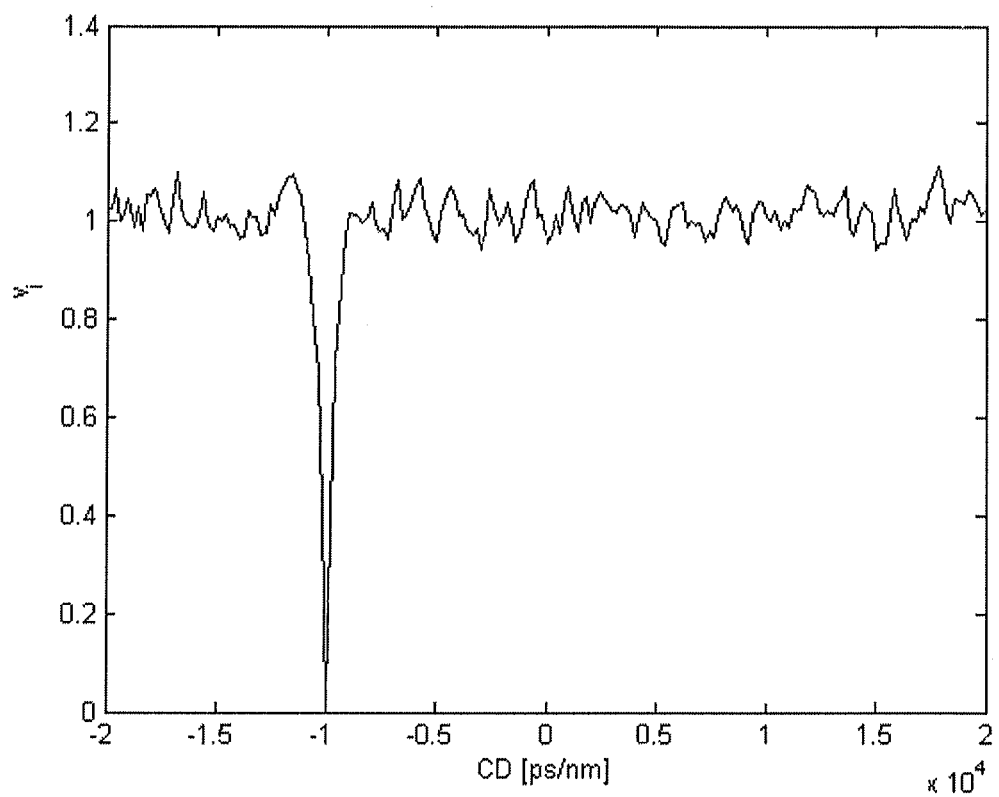
FIG. 5 shows mean values.

FIG. 4 shows, by way of example, correlation values $U_i(\tau)$ wherein corresponding mean values $v_i$ representing an error criterion are depicted in FIG. 5 depending on the chromatic dispersion CD expressed in ps/nm. By way of example, the minimum CD value may be found for 1*10^4.

Figure 6:
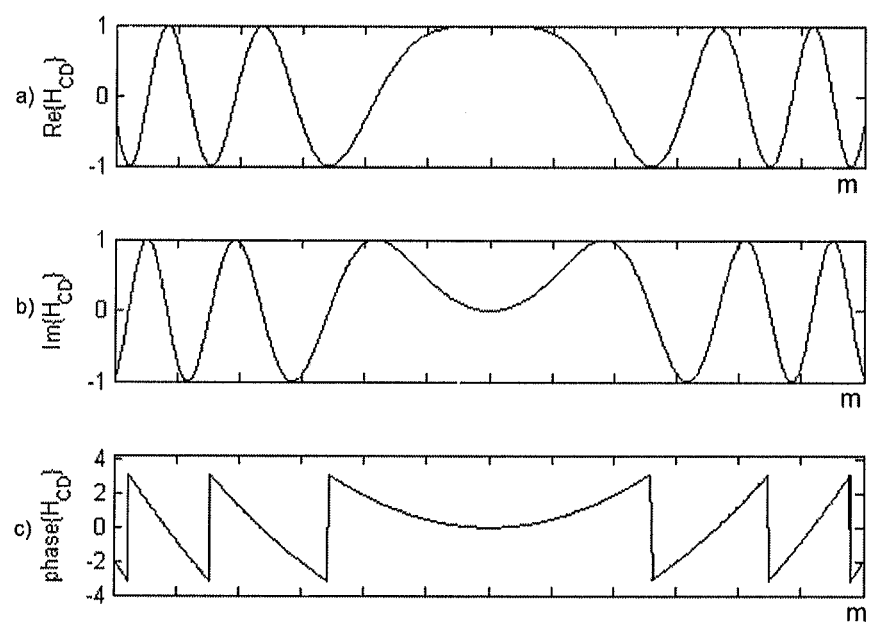
FIG. 6 shows a transfer function.
Figure 7:
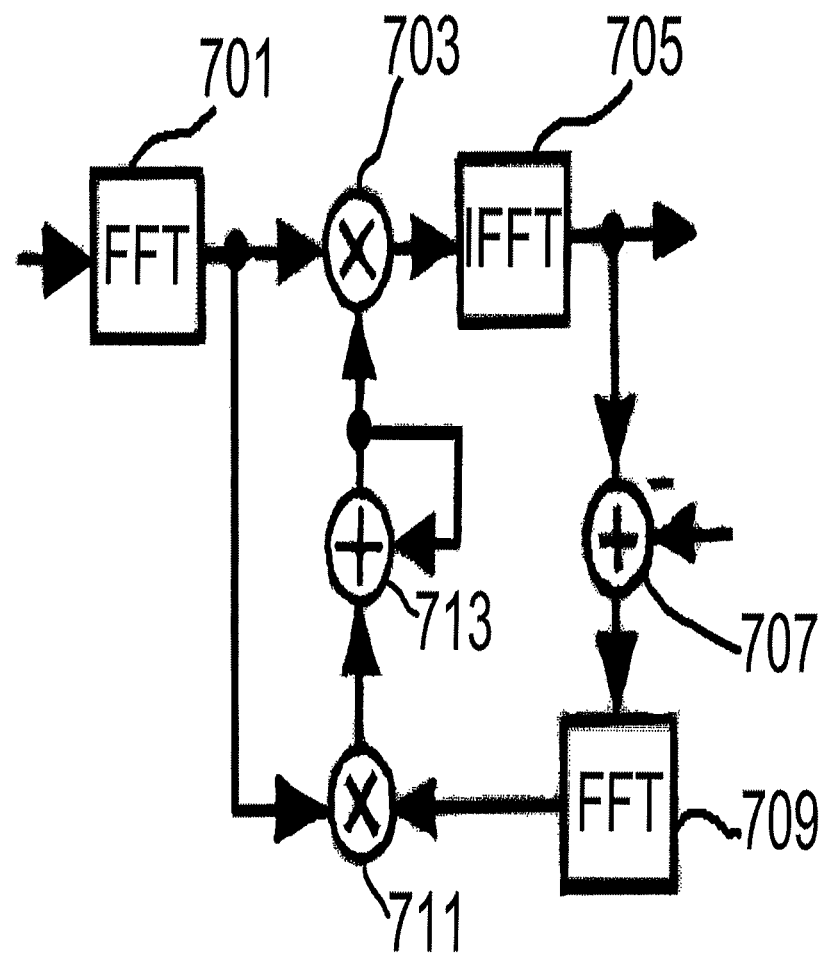
FIG. 7 shows a filter structure.

FIG. 6 demonstrates, by way of example, the associated coefficients of the frequency do main transfer function representing the filter coefficients $H_{CD}$ in dependency on the index m of the vector $H_{CD}$. In particular, FIG. 6a depicts a real part $Re\{H_{CD}\}$, FIG. 6b depicts an imaginary part, $Im\{H_{CD}\}$ and FIG. 6c depicts a phase of the $H_{CD}$. In particular, the filtering function $H_{CD}$ is defined in particular by the parameters of the residual chromatic dispersion. The filtering function comprising e.g. a plurality of filter coefficients, each being associated with a different frequency bin, may completely be determined in frequency domain without referring to time domain signals during the acquisition or adaptation process. Thus, the filter adaptation is performed independently from the modulation format or the data rate and may be employed in any coherent optical transmission system. Thus, the adaptive filter may be employed in optical transceivers, optical receivers or optical measurement systems, by way of example.

Some implementations of the adaptive filter may be associated with a lower implementation complexity of the estimation algorithm since the estimation criterion, e.g. the mean value, is extracted in frequency domain before the inverse Fourier transform is performed. Furthermore, the estimation procedure may be accelerated which results in a faster acquisition speed and an increased robustness against any channel distortion, which, furthermore, does not require averaging over several FFT blocks for estimating the channel coefficients. Furthermore, some implementations do not require determining the CMA expectation gain which further reduces complexity. In addition, some implementations of the disclosure do not suffer from the problem associated with a differential group delay at half symbol duration or multiples thereof, since the cross-correlation properties may contribute to a mitigation of the polarization effects. Furthermore, the correlation value, e.g. an estimation variable, $U_i(\tau)$ can further be improved by a further weighting function to mitigate the influence of low-pass filtering at the receiver according to some implementations of the disclosure.

The adaptive filter may be employed for chromatic dispersion monitoring at any place in the transmission link using e.g. a low-speed analog-to-digital converters and an asynchronous sampling. Furthermore, if coherent receivers are implemented or integrated, further devices for optical performance monitoring may be implemented using the inventive adaptation concept.

The particular combinations of elements and features in the above detailed embodiments are exemplary only; the interchanging and substitution of these embodiments with other embodiments disclosed herein are also expressly contemplated. As those skilled in the art will recognize, variations, modifications, and other implementations of what is described herein can occur to those of ordinary skill in the art without departing from the spirit and the scope of the disclosure as claimed. Accordingly, the foregoing description is by way of example only and is not intended as limiting. The disclosure's scope is defined in the following claims and the

The invention claimed is:

1. An adaptive filter configured to filter an input signal, comprising:
a processor configured to transform the input signal into a frequency domain signal upon the basis of the Fourier transform;
a processor weighting unit configured to weight at least a portion of the frequency domain signal with a filter coefficient of the dispersion filter in frequency domain to obtain a filtered signal in frequency domain;
a processor configured to correlate the filtered signal in frequency domain to obtain a correlation value; and
a processor configured to adapt the filter coefficient upon the basis of the correlation value;
wherein
the processor is configured to transform a further input signal into a further frequency domain signal upon the basis of the Fourier transform;
the processor is configured to select a further filter coefficient from a plurality of predetermined filter coefficients upon the basis of the correlation value, and to replace the filter coefficient by the further filter coefficient;
the processor is configured to weight at least a portion of the further frequency domain signal with the further filter coefficient to obtain a further filtered signal in frequency domain;
the processor is configured to correlate the further filtered signal in frequency domain, in particular to auto-correlate the further filtered signal in frequency domain, to obtain a further correlation value; and wherein
the processor is configured to determine a mean value of the correlation value or a mean value of an absolute value of the correlation value and a further mean value of the further correlation value or a further mean value of an absolute value of the further correlation value, wherein the processor is further configured to compare the mean value with the further mean value and to choose the filter coefficient for further weighting if the mean value is smaller than or equal to the further mean value, or to choose the further filter coefficient for further filtering if the further mean value is smaller than or equal to the mean value.

2. The adaptive filter according to claim 1, wherein the adaptive filter is an adaptive chromatic dispersion filter or an adaptive group delay compensation filter or an adaptive filter for compensating wavelength-specific attenuation.

3. The adaptive filter according to claim 1, wherein the filtered signal in frequency domain represents an optical signal according to a certain optical polarization, and wherein the processor is configured to perform an auto-correlation of the filtered signal to obtain the correlation value.

4. The adaptive filter according to claim 1, wherein the filtered signal in frequency domain comprises a first filtered signal portion representing an optical signal according to a first optical polarization, and a second filtered signal portion representing an optical signal according to a second optical polarization, and wherein the processor is configured to perform a cross-correlation between the first filtered signal portion and the second filtered signal portion in frequency domain to obtain the correlation value.

5. The adaptive filter according to claim 1, wherein the processor is configured to adapt the filter coefficient upon the basis of an absolute value of the correlation value or upon the basis of a mean value of the correlation value or upon the basis of a mean value of an absolute value of the correlation value.

6. The adaptive filter according to claim 1, wherein the processor is configured to select a further filter coefficient, in particular a coefficient of a transfer function of the adaptive filter in frequency domain, from a plurality of predetermined filter coefficients to adapt the filter coefficient for further weighting.

7. The adaptive filter according to claim 1, wherein input signal comprises a first input signal portion in time domain representing an optical signal according to a first optical polarization, and a second input signal portion in time domain representing an optical signal according to a second optical polarization, wherein the processor is configured to transform the first input signal portion into a first frequency domain signal, and to transform the second input signal portion into a second frequency domain signal, and wherein the processor is configured to weight at least a portion of the first frequency domain signal with the filter coefficient and to weight at least a portion of the second frequency domain signal with a further filter coefficient.

8. The adaptive filter according to claim 1, wherein the input signal comprises a first input signal portion in time domain representing an optical signal according to a first optical polarization, and a second input signal portion in time domain representing an optical signal according to a second optical polarization, and wherein
the processor unit is configured to transform the first input signal portion into a first frequency domain signal, and to transform the second input signal portion into a second frequency domain signal upon the basis of the Fourier transform;
the processor is configured to weight at least a portion of the first frequency domain signal with the filter coefficient to obtain a first filtered signal in frequency domain, and to weight at least a portion of the second frequency domain signal with a further filter coefficient to obtain a second filtered signal in frequency domain;
the processor is configured to cross-correlate the first filtered signal and the second signal in frequency domain to obtain the correlation value; and wherein
the processor is configured to select another filter coefficient from a plurality of predetermined filter coefficients, and to select another further filter coefficient from a plurality of predetermined filter coefficients for further weighting, the other filter replacing the filter coefficient, the other further filter coefficient replacing the further filter coefficient, and wherein the processor is further configured to select the further filter coefficients upon the basis of the correlation value or a mean value of the correlation value or a mean value of an absolute value of the correlation value.

9. The adaptive filter according to claim 1, wherein the adaptive filter is an a linear filter, in particular an all-pass filter comprising the same absolute value within a predetermined value range, or a band-pass filter, or a low-pass filter or a high-pass filter.

10. Communication apparatus, comprising the adaptive filter according to claim 1 for adaptively filtering the input signal, the communication apparatus being a communication receiver configured to receive the input signal prior to filtering, or a communication transmitter configured to transmit the input signal after filtering, or a measurement apparatus configured to measure a chromatic dispersion.

11. The adaptive filter according to claim 4, wherein input signal comprises a first input signal portion in time domain representing an optical signal according to a first optical polarization, and a second input signal portion in time domain representing an optical signal according to a second optical polarization, wherein the processor is configured to transform the first input signal portion into a first frequency domain signal, and to transform the second input signal portion into a second frequency domain signal, and wherein the processor is configured to weight at least a portion of the first frequency domain signal with the filter coefficient and to weight at least a portion of the second frequency domain signal with a further filter coefficient.

12. The adaptive filter according to claim 4, wherein the input signal comprises a first input signal portion in time domain representing an optical signal according to a first optical polarization, and a second input signal portion in time domain representing an optical signal according to a second optical polarization, and wherein
    the processor is configured to transform the first input signal portion into a first frequency domain signal, and to transform the second input signal portion into a second frequency domain signal upon the basis of the Fourier transform;
    the processor is configured to weight at least a portion of the first frequency domain signal with the filter coefficient to obtain a first filtered signal in frequency domain, and to weight at least a portion of the second frequency domain signal with a further filter coefficient to obtain a second filtered signal in frequency domain;
    the processor is configured to cross-correlate the first filtered signal and the second signal in frequency domain to obtain the correlation value; and wherein the processor is configured to select another filter coefficient from a plurality of predetermined filter coefficients, and to select another further filter coefficient from a plurality of predetermined filter coefficients for further weighting, the other filter replacing the filter coefficient, the other further filter coefficient replacing the further filter coefficient, and wherein the processor is further configured to select the further filter coefficients upon the basis of the correlation value or a mean value of the correlation value or a mean value of an absolute value of the correlation value.

13. Method, performed by a processor, for adapting filter coefficients of an adaptive filter, the method comprising:
    transforming, by the processor, an input signal into a frequency domain signal upon the basis of the Fourier transform;
    selecting, by the processor, a further filter coefficient from a plurality of predetermined filter coefficients upon the basis of the correlation value, and to replace the filter coefficient by the further filter coefficient;
    weighting, by the processor, at least a portion of the frequency domain signal with a filter coefficient to obtain a filtered signal in frequency domain;
    correlating, by the processor, at least a portion of the filtered signal in frequency domain to obtain a correlation value;
    adapting, by the processor, the filter coefficient upon the basis of the correlation value;
    transforming, by the processor, a further input signal into a further frequency domain signal upon the basis of the Fourier transform;
    weighting, by the processor, at least a portion of the further frequency domain signal with the further filter coefficient to obtain a further filtered signal in frequency domain; and
    correlating, by the processor, the further filtered signal in frequency domain, in particular to auto-correlate the further filtered signal in frequency domain, to obtain a further correlation value; and wherein the processor is configured to determine a mean value of the correlation value or a mean value of an absolute value of the correlation value and a further mean value of the further correlation value or a further mean value of an absolute value of the further correlation value, wherein the processor is further configured to compare the mean value with the further mean value and to choose the filter coefficient for further weighting if the mean value is smaller than or equal to the further mean value, or to choose the further filter coefficient for further filtering if the further mean value is smaller than or equal to the mean value.

14. Method for processing an input signal, the method, performed by the processor, comprising:
    adapting, by the processor, coefficients of a filter to the method for adapting filter coefficients according to claim 13 to obtain adapted filter coefficients; and
    filtering, by the processor, the input signal using the adapted filter coefficients.

15. Computer program executed by a processor comprising a program code for executing the method, by the processor, according to claim 13 when run in a computer.

16. The adaptive filter according to claim 13, wherein input signal comprises a first input signal portion in time domain representing an optical signal according to a first optical polarization, and a second input signal portion in time domain representing an optical signal according to a second optical polarization, wherein the processor is configured to transform the first input signal portion into a first frequency domain signal, and to transform the second input signal portion into a second frequency domain signal, and wherein the processor is configured to weight at least a portion of the first frequency domain signal with the filter coefficient and to weight at least a portion of the second frequency domain signal with a further filter coefficient.

17. The adaptive filter according to claim 16, wherein the input signal comprises a first input signal portion in time domain representing an optical signal according to a first optical polarization, and a second input signal portion in time domain representing an optical signal according to a second optical polarization, and wherein
    the processor is configured to transform the first input signal portion into a first frequency domain signal, and to transform the second input signal portion into a second frequency domain signal upon the basis of the Fourier transform;
    the processor is configured to weight at least a portion of the first frequency domain signal with the filter coefficient to obtain a first filtered signal in frequency domain, and to weight at least a portion of the second frequency domain signal with a further filter coefficient to obtain a second filtered signal in frequency domain;
    the processor is configured to cross-correlate the first filtered signal and the second signal in frequency domain to obtain the correlation value; and wherein the processor is configured to select another filter coefficient from a plurality of predetermined filter coefficients, and to select another further filter coefficient from a plurality of predetermined filter coefficients for further weighting, the other filter replacing the filter coefficient, the other further filter coefficient replacing the further filter coefficient, and wherein the processor is further configured to select the further filter coefficients upon the basis of the correlation value or a mean value of the correlation value or a mean value of an absolute value of the correlation value.

18. Computer program executed by a processor comprising a program code for executing the method, by the processor, according to claim 14 when run in a computer.

\* \* \* \* \*